(12) United States Patent
Shin et al.

(10) Patent No.: US 11,088,427 B2
(45) Date of Patent: Aug. 10, 2021

(54) BATTERY MODULE, AND BATTERY PACK AND VEHICLE COMPRISING SAME

(71) Applicant: LG Chem, Ltd., Seoul (KR)

(72) Inventors: Eun-Gyu Shin, Daejeon (KR);
Jung-Hoon Lee, Daejeon (KR);
Jeong-O Mun, Daejeon (KR);
Byoung-Cheon Jeong, Daejeon (KR)

(73) Assignee: LG Chem, Ltd.

( * ) Notice: Subject to any disclaimer, the term of this patent is extended or adjusted under 35 U.S.C. 154(b) by 242 days.

(21) Appl. No.: 16/465,407

(22) PCT Filed: Apr. 3, 2018

(86) PCT No.: PCT/KR2018/003924
§ 371 (c)(1),
(2) Date: May 30, 2019

(87) PCT Pub. No.: WO2018/186660
PCT Pub. Date: Oct. 11, 2018

(65) Prior Publication Data
US 2020/0006741 A1 Jan. 2, 2020

(30) Foreign Application Priority Data

Apr. 7, 2017 (KR) .......................... 10-2017-0045417

(51) Int. Cl.
*H01M 50/00* (2021.01)
*H01M 50/54* (2021.01)
(Continued)

(52) U.S. Cl.
CPC ............... *H01M 50/54* (2021.01); *B60K 6/28* (2013.01); *B60L 50/64* (2019.02);
(Continued)

(58) Field of Classification Search
CPC ............... H01M 50/54; H01M 10/482; H01M 2220/20; H01M 50/502; H01M 2/26
See application file for complete search history.

(56) References Cited

U.S. PATENT DOCUMENTS

| 7,858,229 B2 | 12/2010 | Shin et al. |
| 2005/0140338 A1 | 6/2005 | Kim et al. |

(Continued)

FOREIGN PATENT DOCUMENTS

| EP | 3340338 A1 | 6/2018 |
| JP | 2014086360 A | 5/2014 |

(Continued)

OTHER PUBLICATIONS

Search report from International Application No. PCT/KR2018/003924, dated Aug. 3, 2018.

(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

A battery module according to the present disclosure includes a plurality of battery cells, each including an electrode lead which extends in horizontal direction from a front side, the electrode lead having at least one bent part, wherein the electrode leads disposed adjacent to each other in up-down direction are stacked in up-down direction in surface contact with each other, and a plurality of lead cartridges, each including two post parts disposed at each of an outer side of one end of the electrode lead and an outer side of the other end, a partition part formed in a shape of a plate which stands erect in up-down direction between the two post parts and having a receiving space in which the electrode leads in surface contact are individually received (Continued)

inside, and a first spacer part which protrudes forward from top of the partition part to space the electrode lead which protrudes out of the receiving space apart from a different electrode lead.

13 Claims, 13 Drawing Sheets

(51) Int. Cl.
*B60L 50/64* (2019.01)
*B60K 6/28* (2007.10)
*H01M 10/48* (2006.01)
*H01M 50/502* (2021.01)

(52) U.S. Cl.
CPC ....... *H01M 10/482* (2013.01); *H01M 50/502* (2021.01); *B60Y 2200/91* (2013.01); *B60Y 2200/92* (2013.01); *B60Y 2400/112* (2013.01); *H01M 2220/20* (2013.01)

(56) References Cited

U.S. PATENT DOCUMENTS

| | | |
|---|---|---|
| 2011/0014512 A1 | 1/2011 | Amagai et al. |
| 2013/0196193 A1 | 8/2013 | Okamoto et al. |
| 2014/0377634 A1 | 12/2014 | Nakajyo |
| 2016/0226043 A1* | 8/2016 | Lee .................. H01M 50/24 |
| 2016/0233465 A1 | 8/2016 | Lee et al. |
| 2016/0233476 A1 | 8/2016 | Okamoto et al. |
| 2017/0077466 A1 | 3/2017 | Choi et al. |

FOREIGN PATENT DOCUMENTS

| | | |
|---|---|---|
| JP | 2015005381 A | 1/2015 |
| JP | 2015056342 A | 3/2015 |
| KR | 20050060187 A | 6/2005 |
| KR | 20080036259 A | 4/2008 |
| KR | 20100111307 A | 10/2010 |
| KR | 20130093145 A | 8/2013 |
| KR | 20140052442 A | 5/2014 |
| KR | 20160016502 A | 2/2016 |
| KR | 20160080358 A | 7/2016 |
| KR | 20160094200 A | 8/2016 |
| KR | 20160094909 A | 8/2016 |
| KR | 20170035218 A | 3/2017 |
| KR | 20170037126 A | 4/2017 |
| KR | 20170037157 A | 4/2017 |

OTHER PUBLICATIONS

Extended European Search Report with Written Opinion for Application No. 18780302.8 dated Apr. 3, 2020, 7 pages.
Search Report from First Indian Office Action for Application No. 201917031801 dated Jan. 25, 2021; 1 page.

* cited by examiner

BATTERY MODULE, AND BATTERY PACK AND VEHICLE COMPRISING SAME

CROSS-REFERENCE TO RELATED APPLICATIONS

The present application is a national phase entry under 35 U.S.C. § 371 of International Patent Application No. PCT/KR2018/003924, filed on Apr. 3, 2018, published in Korean, which claims priority from Korean Patent Application No. 10-2017-0045417, filed on Apr. 7, 2017, the disclosures of which are hereby incorporated herein by reference.

TECHNICAL FIELD

The present disclosure relates to a battery module and a battery pack and a vehicle comprising the same, and more particularly, to a battery module with improved stability of electrical connection between an electrode lead and a sensing terminal and a battery pack and a vehicle comprising the same.

BACKGROUND ART

Recently, with the dramatically increasing demand for portable electronic products such as laptop computers, video cameras, mobile phones and the like, along with the extensive development of electric vehicles, accumulators for energy storage, robots, satellites and the like, many studies are being made on high performance secondary batteries that can be repeatedly recharged.

Currently, commercially available secondary batteries include nickel cadmium batteries, nickel hydrogen batteries, nickel zinc batteries, lithium secondary batteries and the like, and among them, lithium secondary batteries have little or no memory effect, and thus they are gaining more attention than nickel-based secondary batteries for their advantages of free charging/discharging, very low self-discharging, and high energy density.

A lithium secondary battery usually uses a lithium-based oxide and a carbon material for a positive electrode active material and a negative electrode active material respectively. The lithium secondary battery includes an electrode assembly including a positive electrode plate and a negative electrode plate respectively coated with the positive electrode active material and the negative electrode active material with a separator interposed between, and a packaging or a battery case to hermetically receive the electrode assembly together with an electrolyte solution.

In general, lithium secondary batteries may be classified into can-type secondary batteries in which an electrode assembly is embedded in a metal can and pouch-type secondary batteries in which an electrode assembly is embedded in a pouch of an aluminum laminate sheet according to the shape of the case.

More recently, secondary batteries are being widely used in not only small devices such as portable electronic devices but also medium- and large-scale devices such as vehicles or energy storage systems. In particular, with the steady exhaustion of carbon energy and the increasing interest in the environment, attention is paid to hybrid electric vehicles and electric vehicles all over the world including United States, Europe, Japan and the Republic of Korea. In such hybrid electric vehicles or electric vehicles, the most essential component is a battery pack that gives a driving power to an automobile motor. Because hybrid electric vehicles or electric vehicles are supplied with power for driving the vehicles through charging/discharging of battery packs, as compared to vehicles powered by an engine alone, they have higher fuel efficiency and can eliminate or lessen the emission of pollutants, and by this reason, the number of users is now increasing. The battery pack of hybrid electric vehicles or electric vehicles includes a plurality of secondary batteries, and the plurality of secondary batteries is connected in series and in parallel to improve the capacity and output.

To this end, the plurality of secondary batteries has electrode leads that protrude from one surface, and adjacent electrode leads are electrically connected through surface contact between them to satisfy the predesigned capacity and output of the battery pack.

FIG. 1 is a cross-sectional view of a conventional battery module with no cartridge.

Referring to FIG. 1, the conventional battery module B with no cartridge consists only of a plurality of battery cells 1-11, 1-12, 1-21, 1-22 stacked, and the plurality of battery cells 1-11, 1-12, 1-21, 1-22 has bent electrode leads 3-11, 3-12, 3-21, 3-22 respectively.

More specifically, among the adjacent battery cells 1-11, 1-12, the battery cell 1-11 disposed at the lower position has an electrode lead 3-11 that is bent once, and the battery cell 1-12 disposed at the upper position has an electrode lead 3-12 that is bent three times. Each electrode lead 3-11, 3-12 is bent and comes into surface contact with each other, and the bending of each electrode lead 3-11, 3-12 repeats in the same pattern.

In this instance, among the electrode leads 3-11, 3-12, 3-21, 3-22 of the conventional battery module B with no cartridge, the distance L between the end of the electrode leads 3-11, 3-12 in surface contact at the lower position and the electrode leads 3-21, 3-12 in surface contact at the upper position is short, and there is a problem with a short phenomenon occurring between the end of the electrode leads 3-11, 3-12 below and the electrode leads 3-21, 3-12 above during assembly and manufacturing of the battery module B.

FIG. 2 is an exploded perspective view of a conventional battery module with cartridge.

Referring to FIG. 2, to make it easy to stack a plurality of battery cells 1, the conventional battery module B with cartridge may have a cartridge 5 in which the battery cell 1 is received for each battery cell 1.

The conventional battery module B with cartridge has a stack of the battery cells 1 seated in the cartridges 5, so that the battery cells 1 are spaced apart from each other through the cartridges 5, thereby preventing an undesigned connection between the electrode leads 3.

However, because the conventional battery module B with cartridge is manufactured with an addition of the cartridge 5, the energy density reduces due to the volume occupied by the cartridge 5, and production costs increase due to the additional manufacturing cost of the cartridge 5.

DISCLOSURE

Technical Problem

The present disclosure is directed to providing a battery module for preventing an undesigned connection between adjacent electrode leads and a battery pack and a vehicle comprising the same.

The present disclosure is further directed to providing a battery module with improved energy density by volume reduction through a lead cartridge that only receives an electrode lead and a battery pack and a vehicle comprising the same.

The objects of the present disclosure are not limited to the above-mentioned objects and these and other objects and advantages of the present disclosure can be understood by the following description and will be apparent from the embodiments of the present disclosure. Further, it will be readily understood that the objects and advantages of the present disclosure are realized by the means set forth in the appended claims and combinations thereof.

Technical Solution

To solve the above-described technical problem, a battery module according to the present disclosure includes a plurality of battery cells, each including an electrode lead which extends in horizontal direction from a front side, the electrode lead having at least one bent part, wherein the electrode leads disposed adjacent to each other in up-down direction are stacked in up-down direction in surface contact with each other, and a plurality of lead cartridges, each including two post parts disposed at each of an outer side of one end of the electrode lead and an outer side of the other end, a partition part formed in a shape of a plate which stands erect in up-down direction between the two post parts and having a receiving space in which the electrode leads in surface contact are individually received inside, and a first spacer part which protrudes forward from top of the partition part to space the electrode lead which protrudes out of the receiving space apart from a different electrode lead.

Preferably, the lead cartridge may further include a support part which protrudes forward from each of a central part and a lower part of the partition part to support a sensing bus bar.

Preferably, the lead cartridge may further include a second spacer part formed in a shape of a plate which overlies in horizontal direction above or below between the two post parts to space the electrode lead received in the receiving space apart from a different electrode lead.

Preferably, the two post parts, the partition part, the first spacer part, the support part and the second spacer part may be integrally formed.

Preferably, the two post parts, the partition part, the first spacer part, the support part and the second spacer part may be made of an insulating material.

Preferably, the electrode lead may include a first electrode lead which protrudes forward from a left side part of the front side of the battery cell and a second electrode lead which protrudes forward from a right side part of the front side of the battery cell.

Preferably, the lead cartridge may include a first lead cartridge to receive the first electrode lead and a second lead cartridge to receive the second electrode lead, and adjacent post parts of the two post parts of the first lead cartridge and the two post parts of the second lead cartridge may have an engaging part on a contact surface.

Preferably, the second spacer part of the first lead cartridge may be formed in a shape of a plate which overlies in horizontal direction above between the two post parts to space the electrode lead received in the receiving space apart from a different electrode lead disposed above.

Preferably, the second spacer part of the second lead cartridge may be formed in a shape of a plate which overlies in horizontal direction below between the two post parts to space the electrode lead received in the receiving space apart from a different electrode lead disposed below.

Preferably, the lead cartridge may further include a coupling member of cylindrical shape which stands erect in up-down direction.

Preferably, at least one of the two post parts may have a through-hole which runs in up-down direction, and the plurality of lead cartridges stacked in up-down direction may be coupled and fixed with the coupling member inserted into the through-hole.

Preferably, at least one of the two post parts may have a coupling protrusion on one of top and bottom, and the other may have a corresponding coupling groove to the coupling protrusion.

Preferably, the two post parts may have coupling protrusions which protrude from the front side, and the coupling protrusions may be inserted and fitted into coupling grooves formed at both ends of a sensing bus bar.

A battery pack according to an embodiment of the present disclosure may include the above-described battery module.

A vehicle according to an embodiment of the present disclosure may include the above-described battery module.

Advantageous Effects

According to the present disclosure, it is possible to improve electrical stability of the battery module by preventing an undesigned connection between electrode leads and preventing a short phenomenon of the battery module.

Additionally, the present disclosure may reduce the volume and production costs of the battery module by use of the lead cartridge that only receives the electrode lead.

MODE FOR CARRYING OUT THE INVENTION

Figure 1:
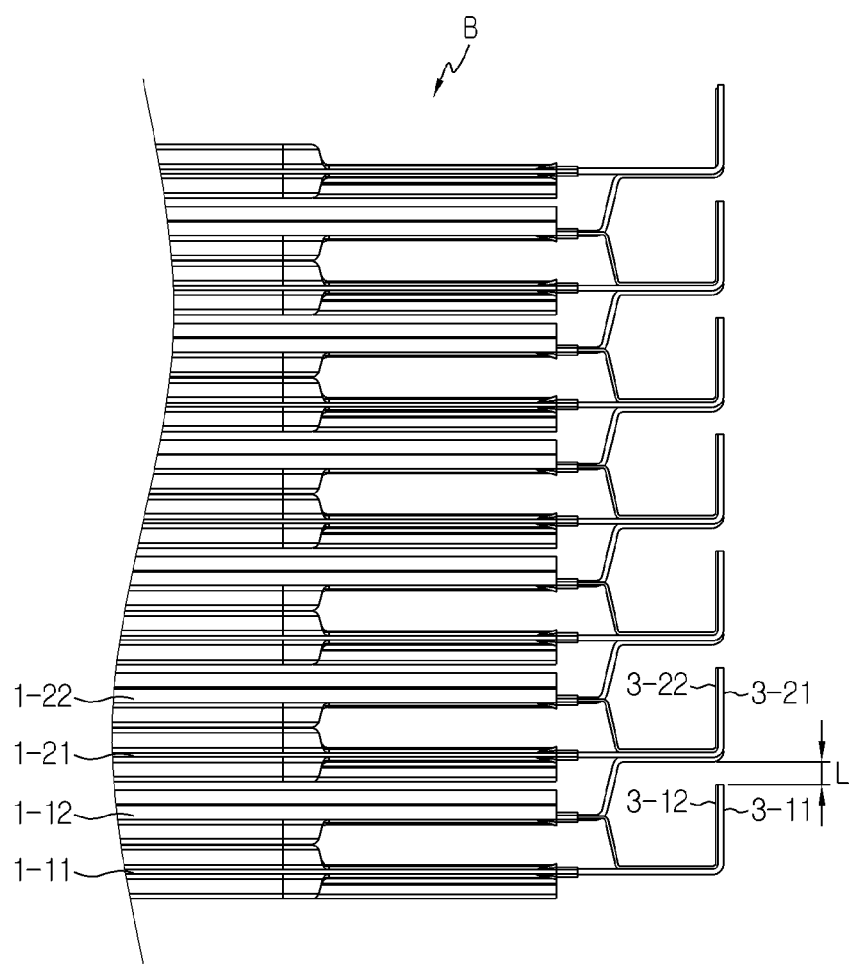
FIG. 1 is a cross-sectional view of a conventional battery module with no cartridge.
Figure 2:
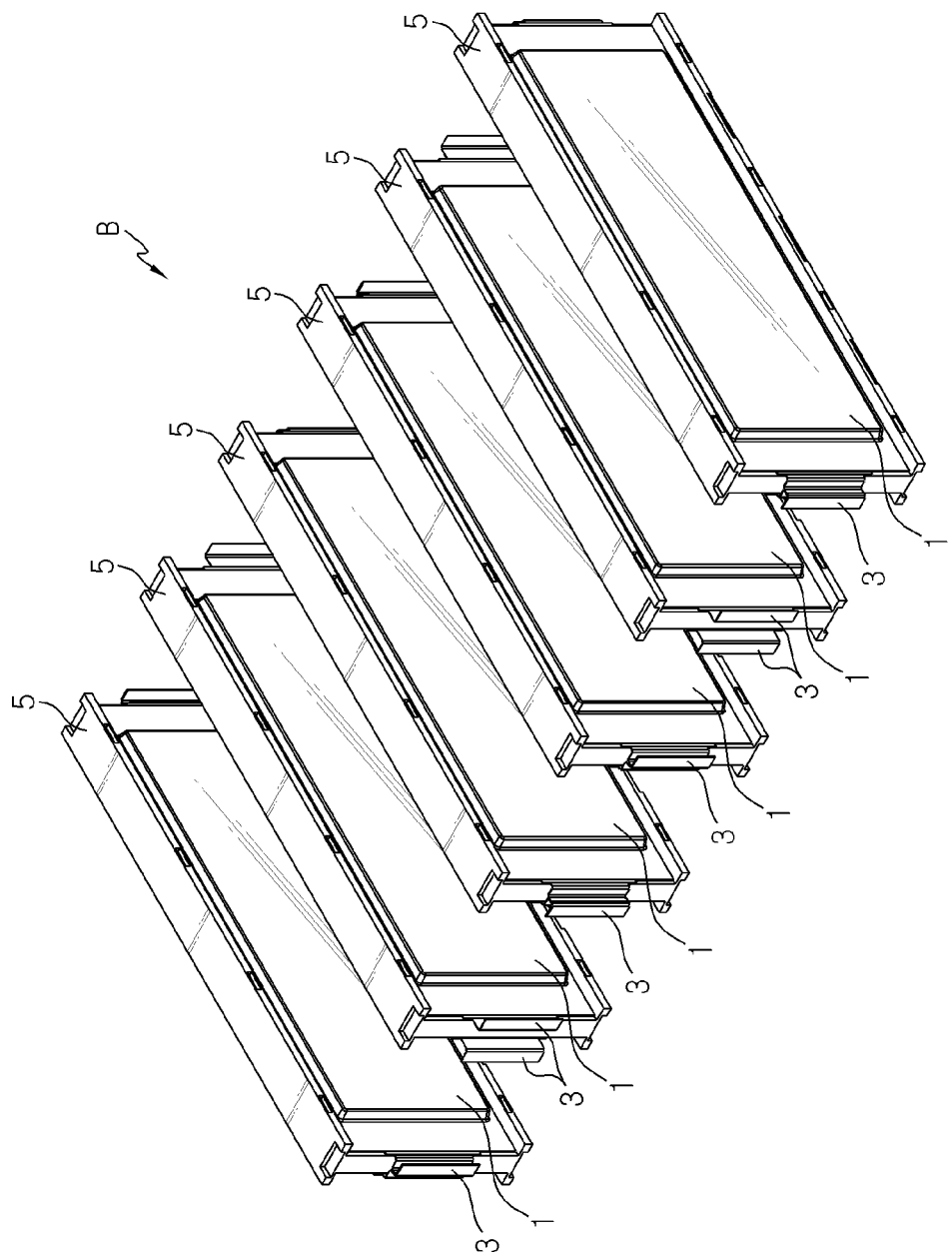
FIG. 2 is an exploded perspective view of a conventional battery module with cartridge.

The above-described objects, features and advantages will be described in detail with reference to the accompanying drawings, and accordingly, those having ordinary skill in the technical field pertaining to the present disclosure will easily practice the technical aspects of the present disclosure. In describing the present disclosure, when it is deemed that a detailed description of relevant known technology unnecessarily renders the key subject matter of the present disclosure ambiguous, the detailed description is omitted herein. Hereinafter, preferred embodiments of the present disclosure will be described in detail with reference to the accompanying drawings. In the drawings, like reference numerals are used to indicate like or similar elements.

Figure 3:
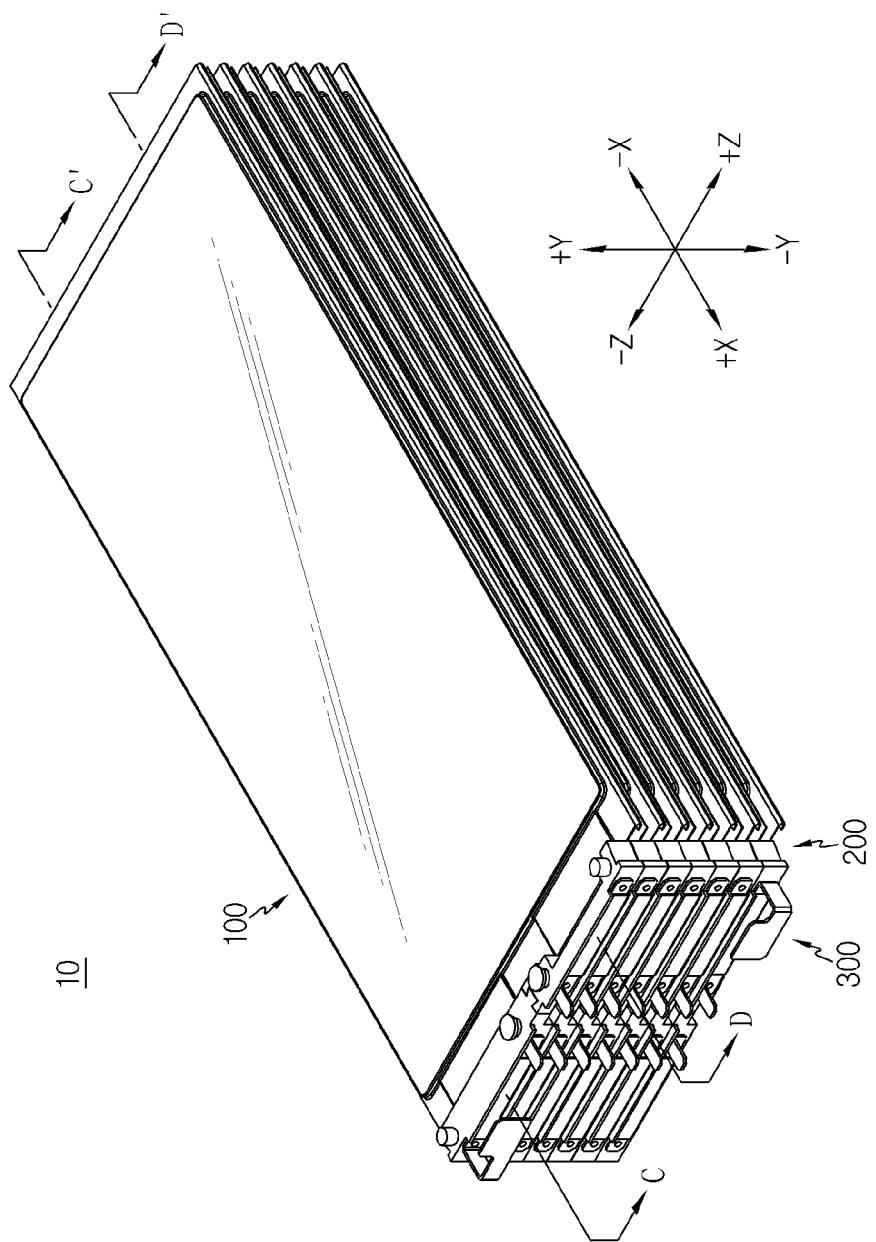
FIG. 3 is a perspective view of a battery module according to an embodiment of the present disclosure.
Figure 4:
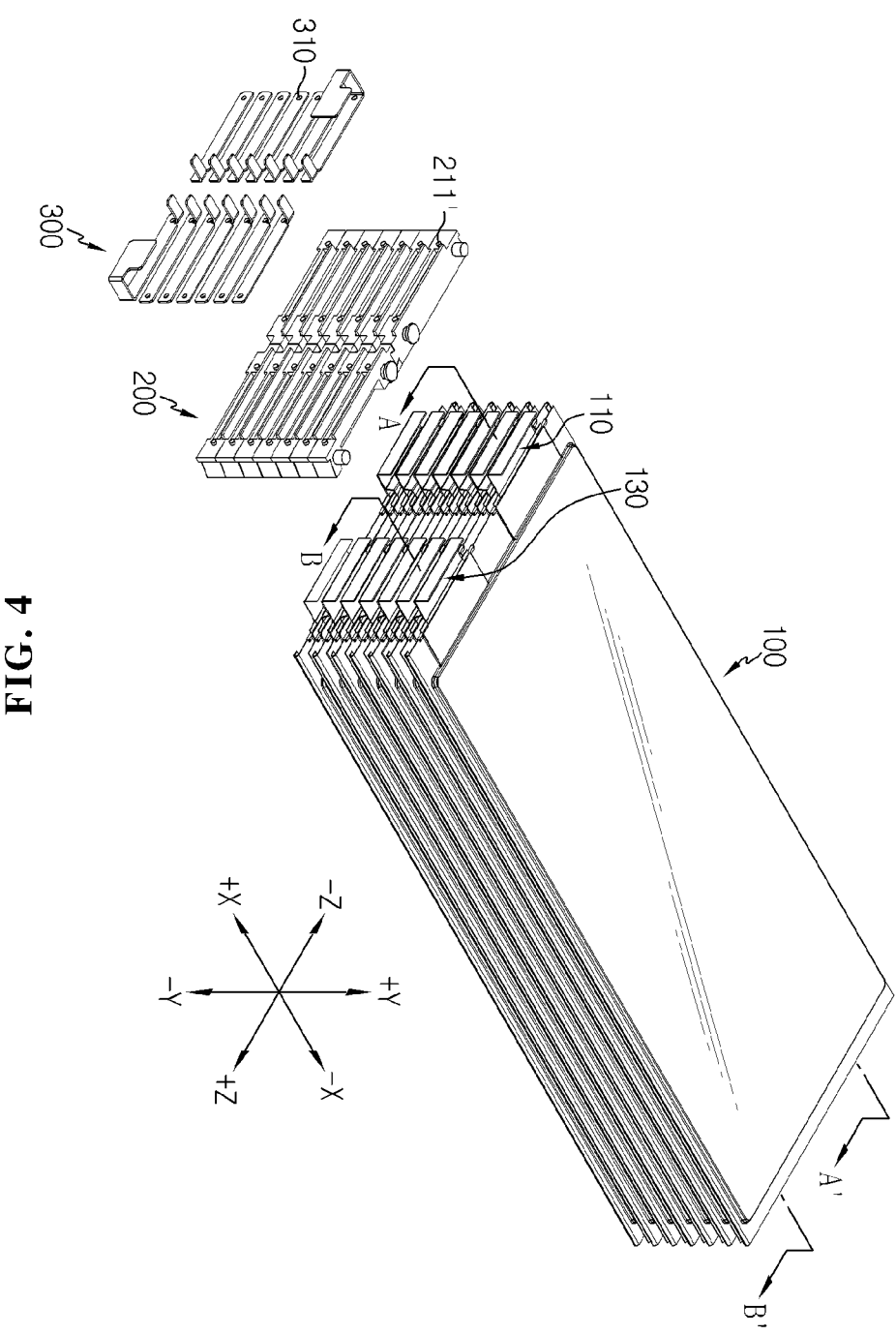
FIG. 4 is an exploded perspective view of a battery module according to an embodiment of the present disclosure

FIG. 3 is a perspective view of a battery module according to an embodiment of the present disclosure, and FIG. 4 is an exploded perspective view of the battery module according to an embodiment of the present disclosure.

Referring to FIGS. 3 and 4, the battery module 10 according to an embodiment of the present disclosure may include a battery cell 100, an electrode lead 110, 130 and a lead cartridge 200.

A plurality of battery cells 100 may be provided, and each battery cell 100 may be stacked on top of one another in up-down direction (±Y axis direction).

The battery cell 100 is not limited to a particular type, and various types of secondary batteries may be adopted for the battery module 10 according to the present disclosure. For example, the battery cell 100 may include lithium ion batteries, lithium polymer batteries, nickel cadmium batteries, nickel hydrogen batteries and nickel zinc batteries. Particularly, the battery cell 100 may be a lithium secondary battery.

Meanwhile, the battery cell 100 may be classified into pouch type, cylindrical and prismatic according to the type of case. Particularly, the battery cell 100 of the battery module 10 according to the present disclosure may be a pouch-type secondary battery.

When the battery cell 100 is a pouch-type secondary battery, as shown in FIGS. 3 and 4, wide surfaces may be positioned on top of one another so that the wide surfaces may be brought into surface contact. Additionally, in this case, each battery cell 100 may have the electrode lead 110, 130 that protrudes in horizontal direction (+X axis direction) from the front side.

The electrode lead 110, 130 may include a first electrode lead 110 that protrudes frontward from the left side part of the front side of the battery cell 100 and a second electrode lead 130 that protrudes frontward from the right side part of the front side of the battery cell 100.

In this instance, the first electrode lead 110 and the second electrode lead 130 may be a positive electrode lead and a negative electrode lead respectively, and the positive electrode lead may be connected to the positive electrode plate of the electrode assembly and the negative electrode lead may be connected to the negative electrode plate of the electrode assembly.

Hereinafter, the structure of the electrode lead will be described in detail.

Figure 5:
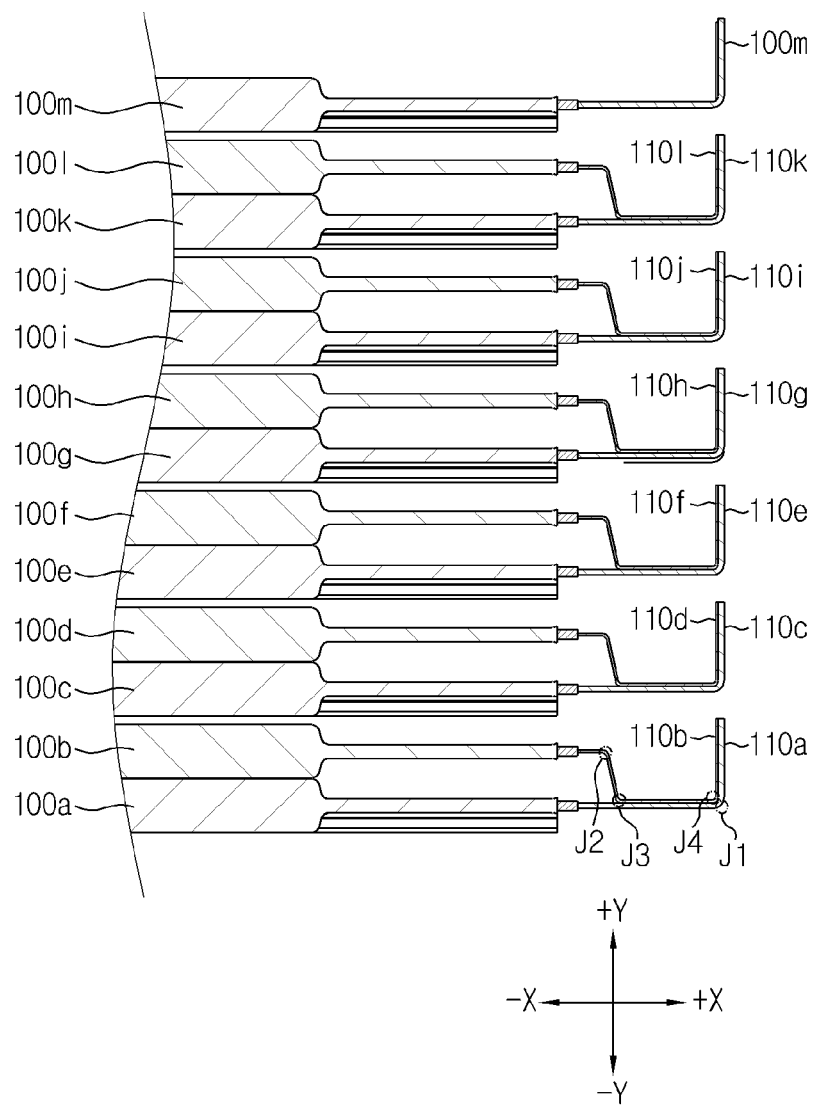
FIG. 5 is a cross-sectional view taken along the line A-A' of FIG. 4.
Figure 6:
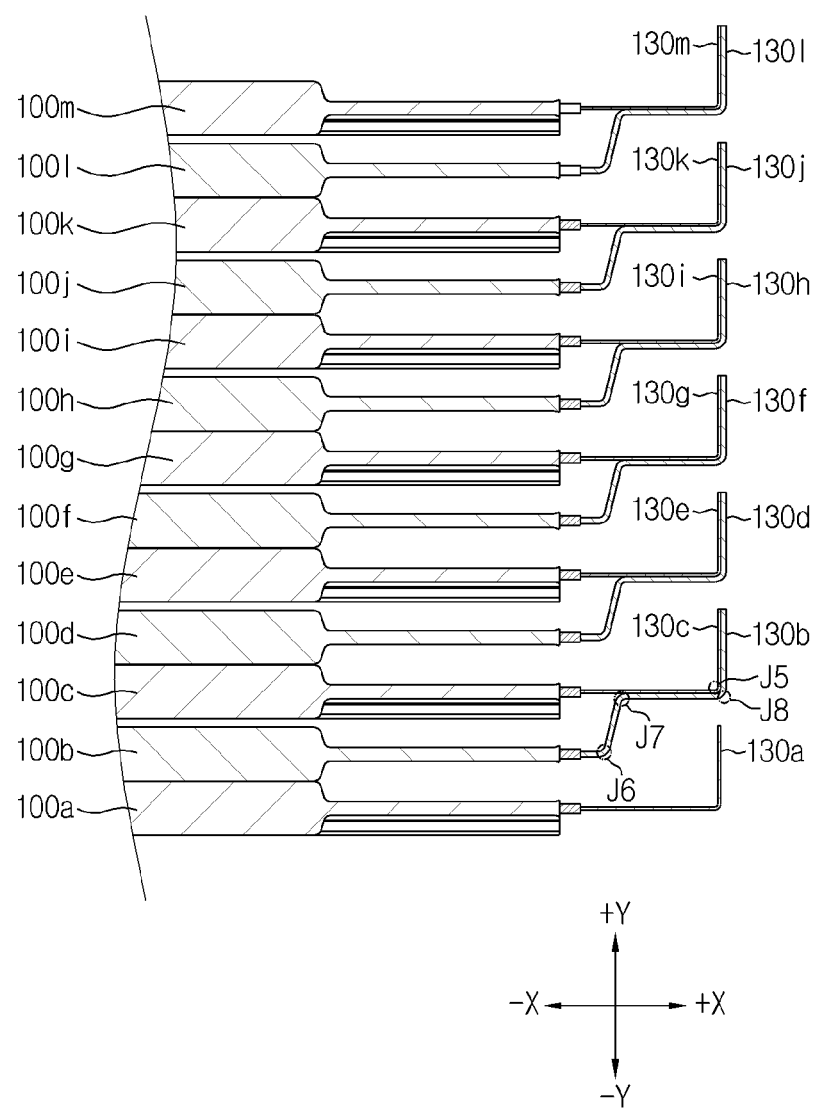
FIG. 6 is a cross-sectional view taken along the line B-B' of FIG. 4.

FIG. 5 is a cross-sectional view taken along the line A-A' of FIG. 4, and FIG. 6 is a cross-sectional view taken along the line B-B' of FIG. 4.

Referring further to FIGS. 5 and 6, the electrode lead 110, 130 may extend in horizontal direction (+X axis direction) from the front side of the battery cell 100, and have at least one bent part. Particularly, adjacent electrode leads may have bent parts facing each other for surface contact with each other.

More specifically, as shown in FIG. 5, each battery cell 100a, . . . , 100m stacked in first to thirteenth layers may have a first electrode lead 110a, . . . , 110m that extends in horizontal direction (+X axis direction) from the left side part of the front side.

Among the first electrode leads 110a, . . . , 110m, the first electrode leads 110a, 110c, 110e, 110g, 110i, 110k, 110m of the battery cells 100a, 100c, 100e, 100g, 100i, 100k, 100m stacked in odd layers, i.e., first, third, fifth, seventh, ninth, eleventh and thirteenth layers respectively may have a first bent part J1 that protrudes and extends in horizontal direction (+X axis direction) and is bent in upward direction (+Y axis direction).

Among the first electrode leads 110a, . . . , 110m, the first electrode leads 110b, 110d, 110f, 110h, 110j, 110l of the battery cells 100b, 100d, 100f, 100h, 100j, 100l stacked in even layers, i.e., second, fourth, sixth, eighth, tenth and twelfth layers respectively may have a second bent part J2 that protrudes and extends in horizontal direction (+X axis direction) and is bent slantly in downward direction (−Y axis direction, +X axis direction).

Additionally, the first electrode leads 110b, 110d, 110f, 110h, 110j, 110l in even layers may have a third bent part J3 that extends from the second bent part J2 and is bent in horizontal direction (+X axis direction) at a contact point with the first electrode leads 110a, 110c, 110e, 110g, 110i, 110k, in odd layers.

Additionally, the first electrode leads 110b, 110d, 110f, 110h, 110j, 110l in even layers may have a fourth bent part J4 that extends from the third bent part J3 and is bent in upward direction (+Y axis direction) at a point corresponding to the location of the first bent part J1 of the first electrode leads 110a, 110c, 110e, 110g, 110i, 110k, in odd layers.

Through this, the first electrode leads 110a, 110c, 110e, 110g, 110i, 110k in odd layers and the first electrode leads 110b, 110d, 110f, 110h, 110j, 110l in even layers except the uppermost layer may have surface contact between adjacent layers from the third bent part J3 to the end, and may be electrically connected to each other.

Meanwhile, as shown in FIG. 6, each of the battery cells 100a, . . . , 100m stacked in first to thirteenth layers may have a second electrode lead 130a, . . . , 130m that extends in horizontal direction (+X axis direction) from the right side part of the front side.

Among the second electrode leads 130a, . . . , 130m, the second electrode leads 130a, 130c, 130e, 130g, 130i, 130k, 130m of the battery cells 100a, 100c, 100e, 100g, 100i, 100k, 100m stacked in odd layers, i.e., first, third, fifth, seventh, ninth, eleventh and thirteenth layers respectively may have a fifth bent part J5 that protrudes and extends in horizontal direction (+X axis direction) and is bent in upward direction (+Y axis direction).

Among the second electrode leads 130a, . . . , 130m, the second electrode leads 130b, 130d, 130f, 130h, 130j, 130l of the battery cells 100b, 100d, 100f, 100h, 100j, 100l stacked in even layers, i.e., second, fourth, sixth, eighth, tenth and twelfth layers respectively may have a sixth bent part J6 that protrudes and extends in horizontal direction (+X axis direction) and is bent slantly in upward direction (+Y axis direction, +X axis direction).

Additionally, the second electrode leads 130b, 130d, 130f, 130h, 130j, 130l in even layers may have a seventh bent part J7 that extends from the sixth bent part J6 and is bent in horizontal direction (+X axis direction) at a contact point with the second electrode leads 130a, 130c, 130e, 130g, 130i, 130k, 130m in odd layers.

Additionally, the second electrode leads 130b, 130d, 130f, 130h, 130j, 130l in even layers may have an eighth bent part J8 that extends from the seventh bent part J7 and is bent in upward direction (+Y axis direction) at a point corresponding to the location of the fifth bent part J5 of the second electrode leads 130a, 130c, 130e, 130g, 130i, 130k, 130m in odd layers.

Through this, the second electrode leads 130c, 130e, 130g, 130i, 130k, 130m in odd layers and the second electrode leads 130b, 130d, 130f, 130h, 130j, 130l in even layers except the lowermost layer may have surface contact with each other between adjacent layers from the seventh bent part J7 to the end, and may be electrically connected to each other.

Hereinafter, the lead cartridge 200 according to an embodiment of the present disclosure will be described.

Figure 7:
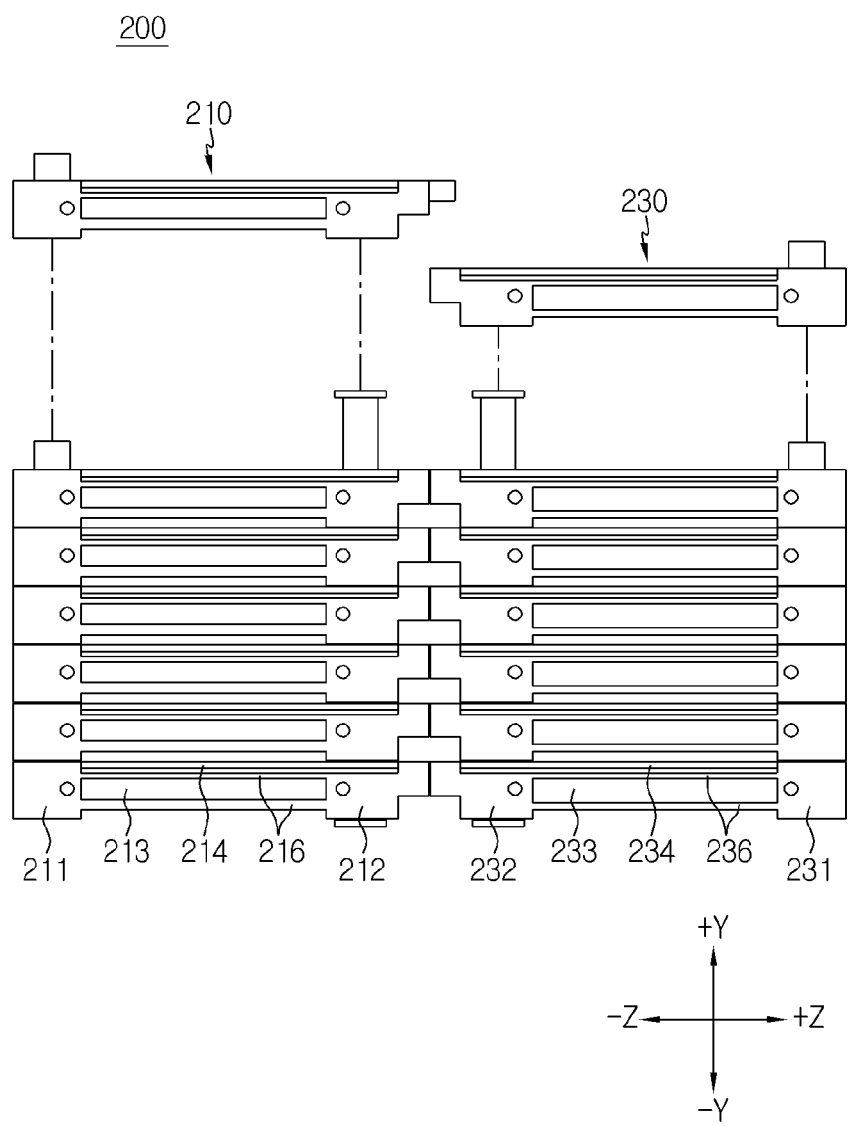
FIG. 7 is a front view of a lead cartridge according to an embodiment of the present disclosure.
Figure 8:
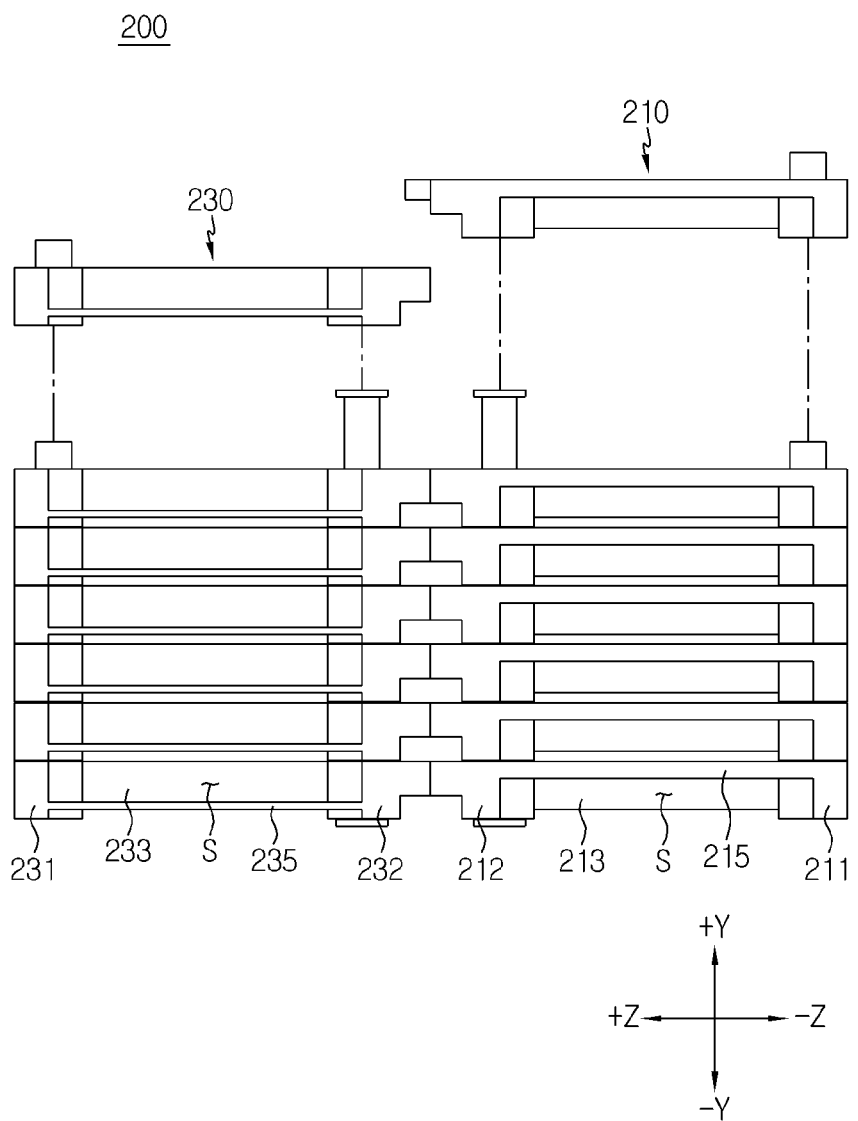
FIG. 8 is a rear view of a lead cartridge according to an embodiment of the present disclosure.
Figure 9:
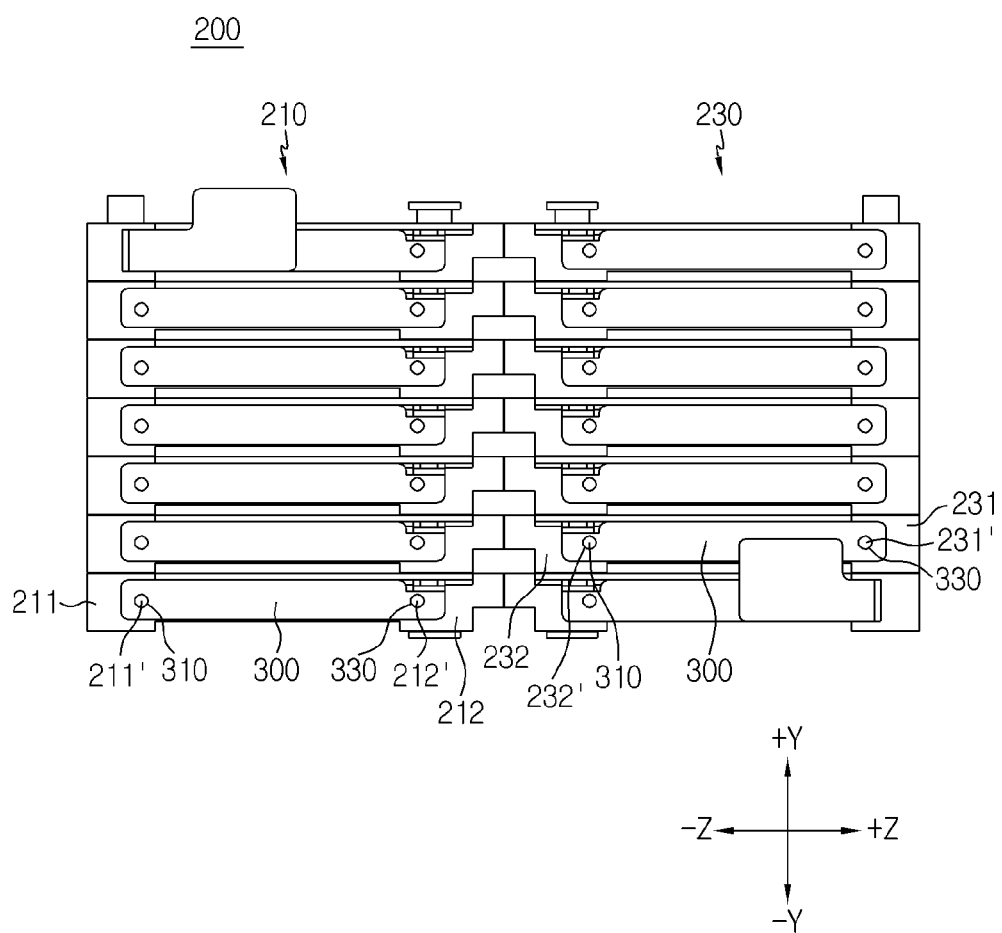
FIG. 9 is a diagram schematically showing that a lead cartridge according to an embodiment of the present disclosure and a sensing bus bar are coupled.
Figure 10:
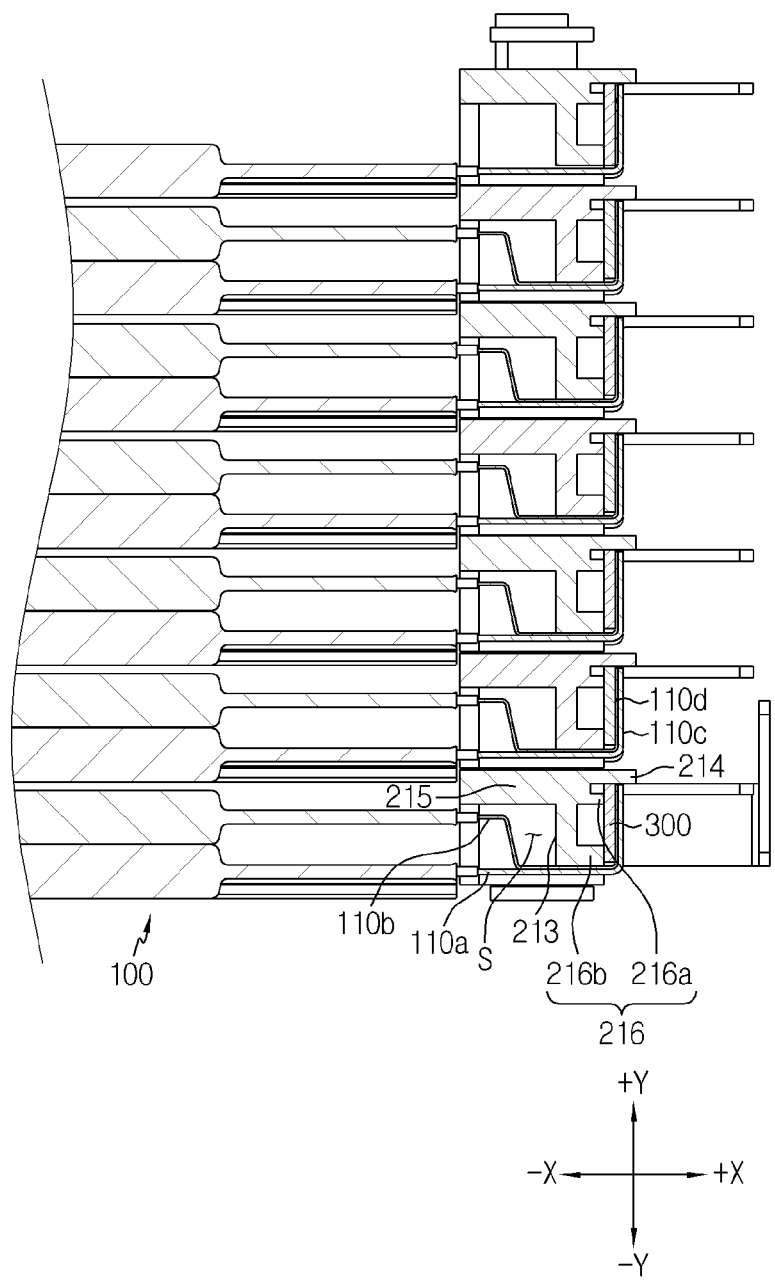
FIG. 10 is a cross-sectional view taken along the line C-C' of FIG. 3.
Figure 11:
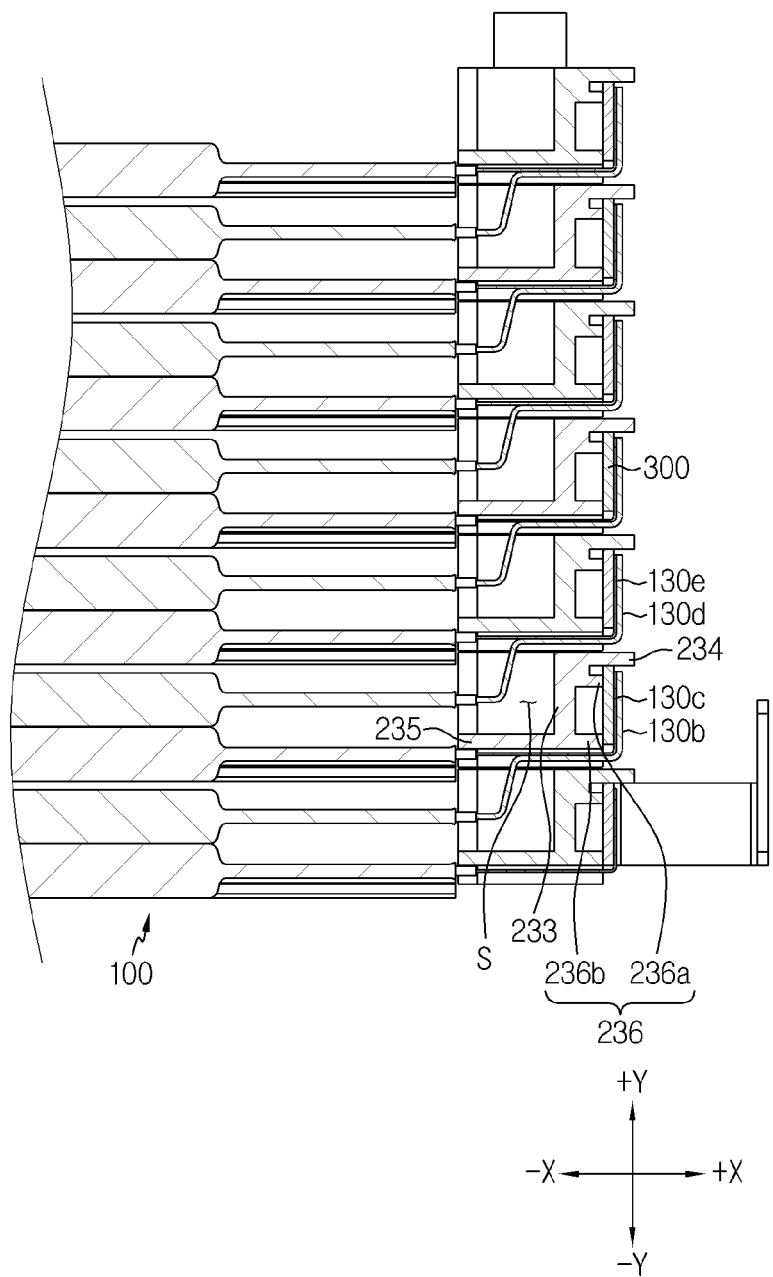
FIG. 11 is a cross-sectional view taken along the line D-D' of FIG. 3.

FIG. 7 is a front view of the lead cartridge according to an embodiment of the present disclosure, FIG. 8 is a rear view of the lead cartridge according to an embodiment of the present disclosure, FIG. 9 is a diagram schematically showing that the lead cartridge according to an embodiment of the present disclosure and a sensing bus bar are coupled, FIG. 10 is a cross-sectional view taken along the line C-C' of FIG. 3, and FIG. 11 is a cross-sectional view taken along the line D-D' of FIG. 3.

Referring further to FIGS. 7 to 11, the lead cartridge 200 may receive a portion of the electrode leads 110, 130 inside so that only the electrode leads 110, 130 in contact with each other are electrically connected. Additionally, the lead cartridge 200 may allow the remaining portion of the electrode leads 110, 130 to protrude outward and the protruding electrode leads 110, 130 to be spaced apart from each other.

To this end, the lead cartridge 200 may be individually provided in each of the electrode leads 110, 130 in contact with each other, and may be stacked in up-down direction (±Y axis direction) in which the battery cells 100 are stacked.

Meanwhile, the lead cartridge 200 may include a first lead cartridge 210 to receive and support the first electrode lead 110 of the electrode leads 110, 130, and a second lead cartridge 230 to receive and support the second electrode lead 130 of the electrode leads 110, 130.

The first lead cartridge 210 and the second lead cartridge 230 have similar configurations and roles, and thus the first lead cartridge 210 will be described first, and the second lead cartridge 230 will be described based on difference(s) between the first lead cartridge 210 and the second lead cartridge 230.

The first lead cartridge 210 may include two post parts 211, 212, a partition part 213, a first spacer part 214, a second spacer part 215 and a support part 216.

The two post parts 211, 212 may be formed in the shape of a rectangular prism and disposed on the outer side of one end of the first electrode lead 110 and the outer side of the other end to serve to support the above-described elements of the first lead cartridge 210.

More specifically, the first electrode lead 110 may be disposed between the two post parts 211, 212 to support each of the partition part 213, the first spacer part 214, the second spacer part 215 and the support part 216 formed in the shape of a plate along the lengthwise direction of the first electrode lead 110 on the outer side of one end and the outer side of the other end.

In other words, the key elements of the first lead cartridge 210, the partition part 213, the first spacer part 214, the second spacer part 215 and the support part 216 may be supported by the two post parts 211, 212 each disposed on the outer side of one end and the outer side of the other end to receive and support the first electrode lead 110.

Meanwhile, the two post parts 211, 212 may couple the first lead cartridges 210 disposed adjacent to each other at the upper and lower positions, and couple the first lead cartridge 210 and the second lead cartridge 230 disposed adjacent to each other at the left and right positions. The role of the two post parts 211, 212 of coupling the lead cartridges will be described in more detail as below.

The partition part 213 may be formed in the shape of a plate that stands erect in up-down direction (±Y axis direction) between the two post parts 211, 212, and a receiving space S for receiving the surface contacting portions of the first electrode leads 110a, 110b of the first electrode lead 110.

More specifically, the partition part 213 may stand erect in up-down direction (±Y axis direction) with the outer side of one end and the outer side of the other end being supported from the two post parts 211, 212, forming the receiving space S at the inner side facing the battery cell 100.

Here, the receiving space S may have an open opening facing the battery cell 100, i.e., allowing the first electrode leads 110a, 110b to be inserted into the opposite side of the partition part 213, and the upper surface may be closed by the above-described second spacer part 215.

Additionally, each of one surface and the other surface of the receiving space S may be closed by the inner side surfaces of the two post parts 211, 212.

That is, each of the front surface and the upper surface of the receiving space S may be closed by the partition part 213 and the second spacer part 215, and each of one surface and the other surface, in other words, two side surfaces may be closed by the inner side surfaces of the two post parts 211, 212, and the surface facing the battery cell 100 may be an open space.

In the process of manufacturing the battery module 10, the first electrode leads 110a, 110b in surface contact may be inserted into the opening of the receiving space S in which portions of the first electrode leads 110a, 110b may be received.

Accordingly, portions of the first electrode leads 110a, 110b inserted into the receiving space S are spaced apart from the different first electrode leads 110c, 110d disposed above by the second spacer part 215, thereby preventing a short phenomenon between the first electrode leads 110a, 110b, 110c, 110d that may occur in the manufacture of the battery module 10.

The first spacer part 214 may protrude in left-right direction (+X axis direction) from the top of the partition part 213.

More specifically, the first spacer part 214 may protrude facing away from the battery cell 100 on the top of the partition part 213, and each of the outer side of one end and the outer side of the other end of the first spacer part 214 may be coupled to the two post parts 211, 212 and supported from the two post parts 211, 212.

In other words, the first spacer part 214 and the partition part 213 may be coupled at a right angle, and a cross section viewed from one end or the other end may have '¬' shape.

Meanwhile, the first spacer part 214 may be disposed above the first electrode leads 110a, 110b that protrude out of the receiving space S and may protrude further in horizontal direction (+X axis direction) than the first electrode leads 110a, 110b that protrude out of the receiving space S.

Through this, the first spacer part 214 may allow the first electrode leads 110a, 110b that protrude out of the receiving space S and the different first electrode leads 110c, 110d disposed above to be spaced apart from each other, thereby preventing a short phenomenon between the first electrode leads 110a, 110b, 110c, 110d that may occur in the manufacture of the battery module 10.

The second spacer part 215 may be formed in the shape of a plate that overlies in horizontal direction (±X axis direction) above between the two post parts 211, 212 as described above.

That is, each of the outer side of one end of the second spacer part 215 and the outer side of the other end may be supported on the two post parts 211, 212 between the two post parts 211, 212, and the front surface facing away from the battery cell 100 may be coupled with the upper inner side of the partition part 213.

Through this, the second spacer part 215 may allow the portions of the first electrode leads 110a, 110b received in the receiving space S to be spaced apart from the different first electrode leads 110c, 110d disposed above inside the receiving space S.

Accordingly, the second spacer part 215 may prevent a short phenomenon between the first electrode leads 110a, 110b, 110c, 110d that may occur in the manufacture of the battery module 10.

The support part 216 may protrude frontward from each of the central part and the lower part of the partition part 213, and come into surface contact with the sensing bus bar 300 to support and hold the sensing bus bar 300.

The support part 216 may include a first support part 216a that protrudes from the central part of the partition part 213, and a second support part 216b that protrudes from the lower part of the partition part 213.

More specifically, the first support part 216a may protrude from the central part of the partition part 213 and may be disposed below the first spacer part 214, and the second support part 216b may protrude from the lowermost part of the partition part 213.

Additionally, each of the outer side of one end and the outer side of the other end of each of the first support part 216a and the second support part 216b may be coupled with and supported on the two post parts 211, 212.

Meanwhile, the protruding end of the first support part 216a and the second support part 216b may maintain a preset distance from the first electrode leads 110a, 110b that protrude out of the receiving space S.

Here, the preset distance may be equal to or greater than the width of the sensing bus bar 300, and through this, a space in which the sensing bus bar 300 may be seated may be formed between the protruding end of the first support part 216a and the second support part 216b and the first electrode leads 110a, 110b that protrude out of the receiving space S, and a space may be formed in which the seated sensing bus bar 300 and the first electrode leads 110a, 110b that protrude out of the receiving space S may be brought into close surface contact.

Meanwhile, as shown in FIG. 9, the above-described two post parts 211, 212 may have linking protrusions 211', 212' that protrude from the front surface respectively to link the sensing bus bar 300 to the first lead cartridge 210.

More specifically, linking holes 310, 330 may be formed at two ends of the sensing bus bar 300 in the shape of a hole that fits the shape of the linking protrusions 211', 212', and the linking protrusions 211', 212' may be inserted into and linked to the linking holes 310, 330.

In this instance, in the process of manufacturing the battery module 10 according to the present disclosure, the first lead cartridge 210 may be coupled with the first electrode lead 110 with the linking protrusions 211', 212' of the first lead cartridge 210 being pre-inserted into the linking holes 310, 330 of the sensing bus bar 300.

Meanwhile, the two post parts 211, 212, the partition part 213, the first spacer part 214, the second spacer part 215 and the support part 216 provided in the first lead cartridge 210 according to the present disclosure may be integrally formed.

Through this, in the process of manufacturing the battery module 10, movement and assembly of only the first lead cartridge 210 may cause the first electrode leads 110a, 110b to be received and seated in the receiving space S of the first lead cartridge 210, spaced apart from other electrode leads.

Meanwhile, the two post parts 211, 212, the partition part 213, the first spacer part 214, the second spacer part 215 and the support part 216 provided in the first lead cartridge 210 according to the present disclosure may be made of an insulating material.

Through this, it is possible to prevent a short phenomenon caused by an undesigned electrical connection between the first electrode leads 110a, 110b received in the receiving space S inside the first lead cartridge 210, apart from other electrode leads through the first spacer part 214.

Hereinafter, the second lead cartridge 230 according to an embodiment of the present disclosure will be described.

The second lead cartridge 230 according to an embodiment of the present disclosure is substantially identical or similar to the first lead cartridge 210 according to an embodiment of the present disclosure as described previously, and identical or similar elements are not described repeatedly and a description is provided based on difference(s).

The second lead cartridge 230 according to an embodiment of the present disclosure may include two post parts 231, 232, a partition part 233, a first spacer part 234, a second spacer part 235 and a support part 236.

In this instance, the two post parts 231, 232, the partition part 233, the first spacer part 234 and the support part 236 of the second lead cartridge 230 may be respectively the same as the two post parts 211, 212, the partition part 213, the first spacer part 214 and the support part 216 provided in the first lead cartridge 210.

In contrast, as opposed to the second spacer part 215 of the first lead cartridge 210 formed above between the two post parts 211, 212, the second spacer part 235 of the second lead cartridge 230 may be formed in the shape of a plate that overlies in horizontal direction (±X axis direction) below between the two post parts 231, 232.

That is, each of the outer side of one end of the second spacer part 235 and the outer side of the other end may be supported below the two post parts 231, 232 between the two post parts 231, 232, and the front surface facing away from the battery cell 100 may be coupled with the lower inner side of the partition part 233.

Through this, the second spacer part 235 may allow the portions of the second electrode leads 130d, 130e received in the receiving space S to be spaced apart from the different second electrode leads 130b, 130c disposed below inside the receiving space S.

Accordingly, the second spacer part 235 may prevent a short phenomenon between the second electrode leads 130b, 130c, 130d, 130e that may occur in the manufacture of the battery module 10.

Meanwhile, a receiving space S formed from the two post parts 231, 232, and the partition part 233 and the second spacer part 235 of the second lead cartridge 230, here the receiving space S, may have an open opening facing the battery cell 100, i.e., allowing the second electrode leads 130d, 130e to be inserted into the opposite side of the partition part 233, and the bottom surface may be closed by the above-described second spacer part 235.

Additionally, each of one surface and the other surface of the receiving space S may be closed by the inner side surface of the two post parts 231, 232.

That is, each of the front surface and the bottom surface of the receiving space S may be closed by the partition part 233 and the second spacer part 235, and each of one surface and the other surface, in other words, the two side surfaces may be closed by the inner side surfaces of the two post parts 231, 232, and the surface facing the battery cell 100 may be an open space.

In the process of manufacturing of the battery module 10, the second electrode leads 130d, 130e in surface contact may be inserted into the opening of the receiving space S in which portions of the second electrode leads 130d, 130e may be received.

Accordingly, portions of the second electrode leads 130d, 130e inserted into the receiving space S may be spaced apart from the different second electrode leads 130b, 130c disposed below by the second spacer part 235, thereby preventing a short phenomenon between the second electrode leads 130b, 130c, 130d, 130e that may occur in the manufacture of the battery module 10.

Additionally, the first lead cartridge 210 and the second lead cartridge 230 according to the present disclosure only receive and support the first electrode lead 110 and the second electrode lead 130 respectively, and thus have small volume and improved energy density of the battery module 10 as opposed to the conventional cell cartridge that receives and supports all the four sides of the electrode lead and the battery cell.

Hereinafter, coupling between the first lead cartridges 210 and coupling between the first lead cartridge 210 and the second lead cartridge 230 will be described.

Figure 12:
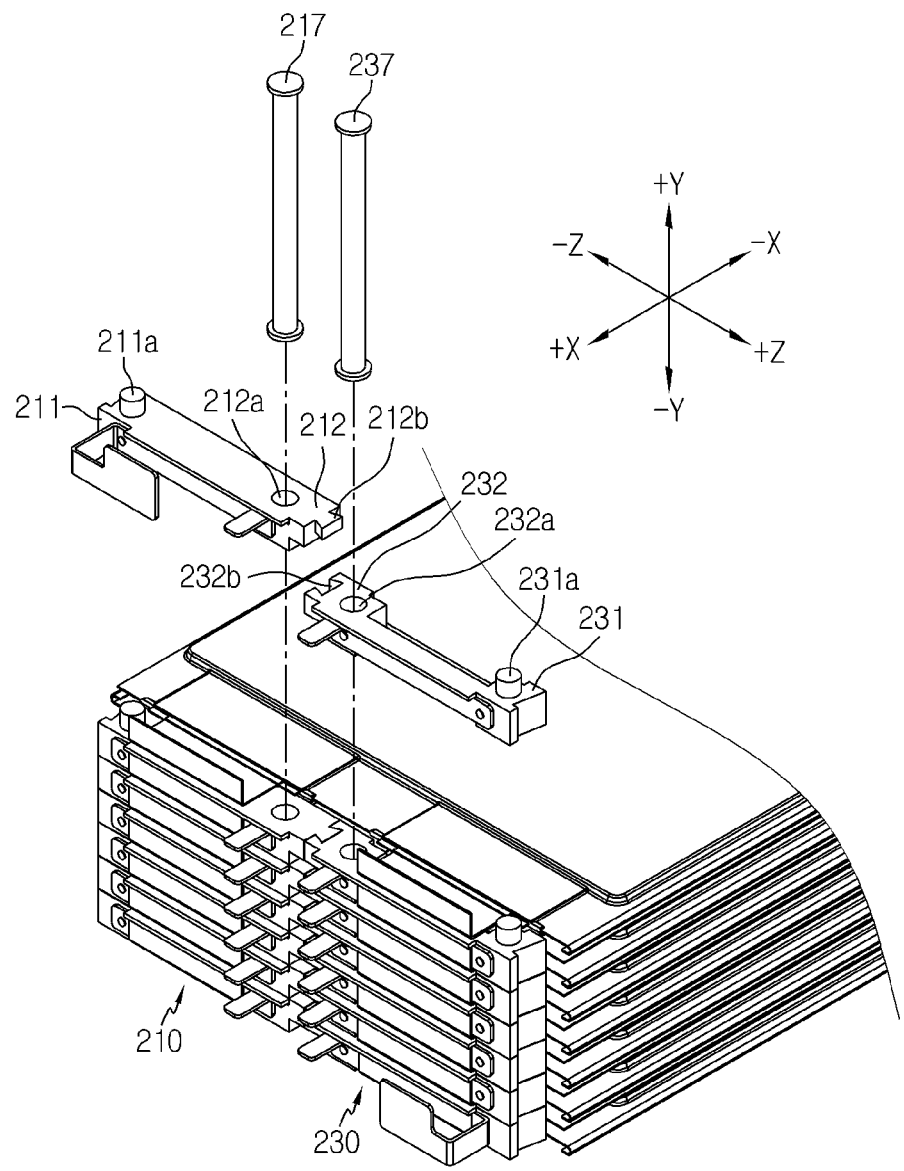
FIG. 12 is a diagram illustrating a process of manufacturing a battery module according to an embodiment of the present disclosure.

FIG. 12 is a diagram illustrating a process of manufacturing the battery module according to an embodiment of the present disclosure.

Referring further to FIG. 12, among the two post parts 211, 212 of the first lead cartridge 210, the post part 211 disposed at one end may have the coupling protrusion 211a that protrudes at any one of the top and bottom, and a coupling groove of a corresponding shape to the shape of the coupling protrusion 211a may be formed at the other one of the top and bottom of the post part 211 disposed at one end in which the coupling protrusion 211a is not formed.

As shown in FIG. 12, the coupling protrusion 211a may be formed in cylindrical shape on the top of the post part 211 according to an embodiment, and the coupling groove of the corresponding shape to the shape of the coupling protrusion 211a may be formed on the bottom of the post part 211.

Here, the coupling protrusion 211a may protrude in upward direction (+Y axis direction) from the top of the post part 211 disposed at one end, and the coupling groove may be dented in downward direction (+Y axis direction) from the bottom of the post part 211 disposed at one end part.

Accordingly, the coupling protrusion 211a of the first lead cartridge 210 may be inserted into the coupling groove of the first lead cartridge 210 stacked above, and the coupling protrusion of the first lead cartridge 210 stacked below may be inserted into the coupling groove of the first lead cartridge 210.

Through this, the first lead cartridge 210 may have continuous coupling of the coupling protrusion 211a and the coupling groove in up-down direction (±Y), increasing the coupling strength to the first lead cartridge 210.

Meanwhile, among the two post parts 211, 212 of the first lead cartridge 210, the post part 212 disposed at the other end may have a through-hole 212a therethrough.

More specifically, the post part 212 disposed at the other end may have a through-hole 212a that runs in up-down direction (±Y axis direction) continuously with the post part 212 of the different first lead cartridge 210.

In this instance, a coupling member 217 of cylindrical shape having a corresponding length to the height of all the stacked first lead cartridges 210 may be inserted into the through-hole 212a in up-down direction (±Y axis direction) to couple and fix the stacked first lead cartridges 210.

For example, the coupling member 217 may be a long bolt made of metal or a rod made of a thermoplastic material.

When the coupling member 217 is a rod made of a thermoplastic material, the coupling member 217 may be inserted into the through-hole 212a of all the stacked first lead cartridge 210 and welded to the first lead cartridge 210 through thermal joining to securely couple and fix the first lead cartridge 210 in up-down direction (±Y axis direction).

Meanwhile, among the two post parts 211, 212 of the first lead cartridge 210, the post part 212 disposed at the other end may have an engaging part 212b on the contact surface with the post part 232 disposed at one end among the two post parts 231, 232 of the second lead cartridge 230.

More specifically, the engaging part 212b may protrude in left-right direction (+Z axis direction) from the post part 212 disposed at the other end.

In response to this, among the two post parts 231, 232 of the second lead cartridge 230, the post part 232 disposed at one end may have an engaging part 232b on the contact surface with the post part 212 disposed at the other end among the two post parts 211, 212 of the first lead cartridge 210.

In this instance, the engaging part 232b of the second lead cartridge 230 may be dented in left-right direction (+Z axis direction) to fit the shape of the protruding engaging part 212b of the first lead cartridge 210.

Accordingly, the first lead cartridges 210 may be securely coupled in up-down direction (±Y axis direction) through coupling between the coupling protrusion 211a and the coupling groove and coupling between the through-hole 212a and the coupling member 217.

Additionally, the first lead cartridge 210 and the second lead cartridge 230 may be securely coupled in left-right direction (±Z axis direction) through the engaging parts 212b, 232b.

Meanwhile, in the same way as the first lead cartridge 210, the post part 231 disposed at the other end among the two post parts 231, 232 of the second lead cartridge 230 may have a coupling protrusion 231a that protrudes from the top and a coupling groove that is dented into the bottom to fit the shape of the coupling protrusion 231a.

Accordingly, the coupling protrusion 231a of the second lead cartridge 230 may be inserted into the coupling groove of the second lead cartridge 230 stacked above, and the coupling protrusion of the second lead cartridge 230 stacked below may be inserted into the coupling groove of the second lead cartridge 230.

Through this, the second lead cartridge 230 may have continuous coupling of the coupling protrusion 231a and the coupling groove in up-down direction (±Y), increasing the coupling strength to the second lead cartridge 230.

Meanwhile, among the two post parts 231, 232 of the second lead cartridge 230, the post part 232 disposed at one end may have a through-hole 232a therethrough, and the coupling member 237 of cylindrical shape having a corresponding length to the height of all the stacked second lead cartridges 230 may be inserted into the through-hole 232a in up-down direction (±Y axis direction) to couple and fix the stacked second lead cartridges 230.

The coupling protrusion 231a, the coupling groove, the through-hole 232a and the coupling member 237 of the second lead cartridge 230 may have the same shape and role as the coupling protrusion 211a, the coupling groove, the through-hole 212a and the coupling member 217 of the first lead cartridge 210 respectively, but only different in the location at which each is coupled.

Hereinafter, a battery module 10' according to another embodiment of the present disclosure will be described.

Figure 13:
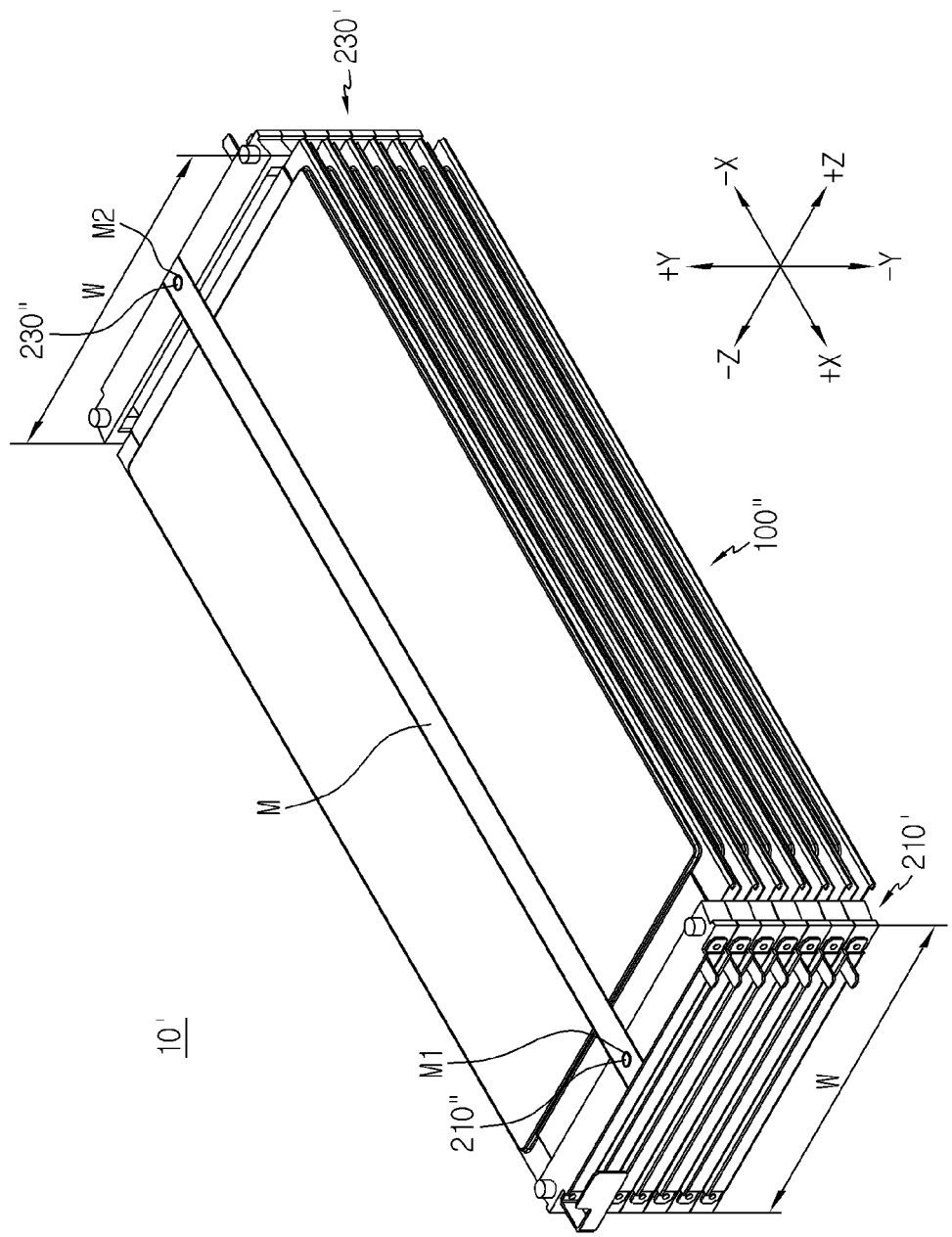
FIG. 13 is a perspective view of a battery module according to another embodiment of the present disclosure.

FIG. 13 is a perspective view of the battery module according to another embodiment of the present disclosure.

Referring to FIG. 13, when comparing the battery module 10' according to another embodiment of the present disclosure and the battery module 10 according to an embodiment of the present disclosure, a battery cell 100" of the battery module 10' according to another embodiment may be a bidirectional secondary battery having an electrode lead on the front side and the rear side, whereas the battery cell 100 of the battery module 10 according to an embodiment may be an unidirectional secondary battery having an electrode lead on only one side (front or rear side).

Accordingly, a lead cartridge of the battery module 10' according to another embodiment may include a first lead cartridge 210' to receive and support the electrode lead provided on the front side of the battery cell 100", and a second lead cartridge 230' to receive and support the electrode lead provided on the rear side of the battery cell 100".

The battery cell 100 according to an embodiment may have two electrode leads on one side, so that the width of each electrode lead may be less than ½ of the width of one side of the battery cell 100. In contrast, the battery cell 100" according to another embodiment has each one electrode lead on one side and the rear side, so that the width of each electrode lead may be ½ or more of the width of one side of the battery cell 100".

Accordingly, the width W of the first lead cartridge 210' and the second lead cartridge 230' that receive and support the electrode leads of the battery cell 100" according to another embodiment may be also ½ or more of the width of one side of the battery cell 100".

In this instance, the first lead cartridge 210' and the second lead cartridge 230' respectively disposed on one side and the rear side of the battery cell 100" may be coupled in horizontal direction (±X axis direction) through a coupling plate M formed in the shape of a long strip.

More specifically, the first lead cartridge 210' and the second lead cartridge 230' may have coupling protrusions 210", 230" that protrude in upward direction (+Y axis direction) from the uppermost part respectively, and the coupling protrusions 210", 230" may be inserted into coupling holes M1, M2 formed through the two ends of the coupling plate M to couple the first lead cartridge 210' and the second lead cartridge 230'.

Through this, the first lead cartridge 210' and the second lead cartridge 230' of the battery module 10' according to another embodiment may be coupled with the coupling plate M, thereby preventing a phenomenon in which they move apart in horizontal direction (±X axis direction) by an external force applied from the outside.

Meanwhile, the battery pack according to the present disclosure includes at least one battery module described above. In this instance, in addition to the battery module, the battery pack may further include a case to receive the battery module and various types of devices to control the charge/discharge of the battery module, for example, a Battery Management System (BMS), a current sensor, a fuse, and the like. Particularly, the battery pack according to an embodiment of the present disclosure may prevent an undesigned electrical connection between electrode leads through the lead cartridge that receives and supports the electrode leads provided in each battery cell of the battery module.

The battery module according to the present disclosure may be applied to a vehicle such as an electric vehicle or a hybrid electric vehicle. That is, the vehicle according to the present disclosure may include the battery module according to the present disclosure.

The above-described present disclosure is not limited to the above-described embodiments and the accompanying drawings, and many substitutions, modifications and changes may be made thereto by those having ordinary skill in the technical field pertaining to the present disclosure without departing from the technical aspects of the present disclosure.

What is claimed is:

1. A battery module comprising:
a plurality of battery cells, each battery cell including an electrode lead that extends in a horizontal direction from a front side of the respective battery cell, each electrode lead having at least one bent part, wherein the electrode leads of adjacent pairs of the battery cells are in surface contact with each other; and
a plurality of lead cartridges, each lead cartridge including two post parts disposed at opposite ends of the electrode leads of one of the adjacent pairs of the battery cells, a plate-shaped partition part extending in a vertical direction and in a horizontal direction between the two post parts and having a receiving space in which the electrode leads of the one of the adjacent pairs of the battery cells are received inside, and a first spacer part that protrudes forward from a top of the partition part, the first spacer part being configured to space the electrode leads of the one of the adjacent pairs of the battery cells from the electrode leads of other ones of the battery cells.

2. The battery module according to claim 1, wherein each lead cartridge further includes a support part that protrudes forward from each of a central part and a lower part of the partition part, each support part being configured to support a respective sensing bus bar.

3. The battery module according to claim 2, wherein each lead cartridge further includes a second plate-shaped spacer part disposed between the two respective post parts, each second spacer part being configured to space the electrode leads of the one of the adjacent pairs of the battery cells from the electrode leads of the other ones of the battery cells.

4. The battery module according to claim 3, wherein the two post parts, the partition part, the first spacer part, the support part and the second spacer part of each lead cartridge are integrally formed.

5. The battery module according to claim 3, wherein the two post parts, the partition part, the first spacer part, the support part and the second spacer part of each lead cartridge are made of an insulating material.

6. The battery module according to claim 3, wherein the electrode leads of the one of the adjacent pairs of the battery cells includes a first electrode lead that protrudes forward from a left side part of the front side of the battery cell and a second electrode lead which protrudes forward from a right side part of the front side of the battery cell, the lead cartridge includes a first lead cartridge configured to receive the first electrode lead and a second lead cartridge configured to receive the second electrode lead, and adjacent post parts of the two post parts of the first lead cartridge and the two post parts of the second lead cartridge have an engaging part on a contact surface configured to couple the adjacent post parts.

7. The battery module according to claim 6, wherein the second spacer part of the first lead cartridge is plate plate-shaped and is disposed between the two post parts, the second spacer part being configured to space the electrode leads of the one of the adjacent pairs of the battery cells from a different electrode lead disposed above.

8. The battery module according to claim 6, wherein the second spacer part of the second lead cartridge is plate plate-shaped and is disposed between the two post parts, the second spacer part being configured to space the electrode leads of the one of the adjacent pairs of the battery cells from a different electrode lead disposed below.

9. The battery module according to claim 1, wherein each lead cartridge further includes a cylindrical coupling member extending in the vertical direction, and at least one of the two post parts has a through-hole that runs in the vertical direction, and the plurality of lead cartridges is coupled and fixed to one another with the coupling member inserted into the through-hole.

10. The battery module according to claim 1, wherein at least one of the two post parts has a coupling protrusion on a top or a bottom thereof, and the other has a coupling groove that corresponds to the coupling protrusion.

11. The battery module according to claim 1, wherein the two post parts each have coupling protrusions that protrude from a front side thereof, and the coupling protrusions are each inserted and fitted into coupling grooves formed at opposite ends of a sensing bus bar.

12. A battery pack comprising the battery module according to claim 1.

13. A vehicle comprising the battery module according to claim 1.

* * * * *